UNITED STATES PATENT OFFICE.

MATHEW E. ROTHBERG, OF JOHNSTOWN, PENNSYLVANIA.

PROCESS OF OBTAINING ALUMINA.

SPECIFICATION forming part of Letters Patent No. 657,453, dated September 4, 1900.

Application filed March 5, 1900. Serial No. 7,407. (No specimens.)

*To all whom it may concern:*

Be it known that I, MATHEW E. ROTHBERG, a citizen of the United States, and a resident of Johnstown, in the county of Cambria and State of Pennsylvania, have invented certain new and useful Improvements in Processes of Manufacturing Alumina; and I do declare the following to be a full, clear, and exact description of the invention, such as will enable others skilled in the art to which it appertains to make and use the same.

The invention has relation to the manufacture of alumina, ($Al_2O_3$;) and it consists in the novel process hereinafter set forth.

In carrying out this process I desire to state in a preliminary way that notwithstanding the rapidly-increasing use of alumina in the arts its production has been somewhat expensive, as it has been practically all made from the mineral bauxite by a somewhat-costly process. Furthermore, bauxite is only found in a limited number of localities. A cheaper method of obtaining alumina is therefore greatly desired, and the present invention is designed to obtain it from ordinary clay, which can be found in almost every locality.

The principal material which I use in carrying out this process is clay, shale, or similar material of which alumina is a constituent. The clay is treated with sulphuric acid in any of the well-known methods by which the alumina contained in it is changed to alumina sulphate, and this sulphate is leached out with water. The aqueous solution of alumina sulphate thus obtained is what I use in the first step of my process; but I may use alumina sulphate obtained in any other manner or from any other source. The alumina-sulphate solution is brought into suitable tanks or vessels, and to it is added about an equal quantity of lime chloride, either dry or, preferably, in aqueous solution, also. This admixture brings about a reaction, the resultant products of which are insoluble lime sulphate, which settles off, and alumina chloride, which, being soluble, remains in the clear liquor. From this alumina-chloride liquor I obtain pure alumina by treating it with quicklime, either in the form of milk of lime or in the solid form. The lime sulphate above referred to as a resultant of the reaction with lime chloride is available for the production of superior plaster-of-paris. This is effected by suitably filtering it from the clear alumina-chloride solution, washing and drying, and, finally, calcining it at a regulated temperature. The above-described reaction between alumina sulphate and calcium chloride is usually not quite complete, a slight proportion of lime sulphate being soluble in the alumina-chloride liquor. In order to purify the liquor from the residual sulphate after the solid lime sulphate has been separated, I add to the liquor a small quantity of barium chloride, either solid or dissolved in water, in such amount as will precipitate all of the remaining sulphate in the liquor and in addition leave dissolved in the alumina-chloride liquor a slight excess of barium chloride, which does not interfere with the subsequent use of the liquor. On the other hand, the presence of any lime sulphate in the aluminous liquor is injurious. The barium sulphate is now filtered off and is found after suitable washing treatment to be a very fine grade known in the arts as "precipitated baryta" and extensively used. To the purified solution of alumina chloride is added quicklime, either dry or in the form of milk of lime, as may be most convenient. The reaction between the lime and the alumina chloride causes the alumina to be precipitated from the solution and the lime to go into the solution in its place as lime chloride. This precipitated alumina is found to be after separation from the lime-chloride liquor by any common method of filtration and after suitable washing and calcination a very superior article for the manufacture of metallic aluminum and for use in the arts where a pure alumina is required. The lime-chloride liquor remaining after the separation of the alumina is, as a final step in the process, returned to the tank used in the first step and is then again combined with a fresh portion of alumina sulphate for the precipitation of lime sulphate, as before. There is thus no loss of lime chloride, as it is used over and over for action of precipitation in fresh portions of alumina-sulphate liquor.

Having described this invention, what I claim, and desire to secure by Letters Patent, is—

1. The process of manufacturing alumina, which consists in mixing lime chloride with a solution of alumina sulphate, subsequently adding lime to the alumina-chloride solution produced thereby, and finally separating and heating the resultant precipitate, substantially as specified.

2. The process of manufacturing alumina, which consists in mixing lime chloride with a solution of alumina sulphate, treating the resultant alumina-chloride solution with barium chloride, adding lime to the alumina-chloride solution so treated and finally separating and heating the resultant precipitate, substantially as specified.

3. The process of simultaneously manufacturing plaster-of-paris, alumina and baryta, which consists in first mixing together solutions of alumina sulphate and lime chloride, and separating out the resultant lime sulphate; secondly, treating the resultant alumina-chloride solution with barium chloride, and separating out the barium sulphate; thirdly, adding lime to the purified alumina, chloride liquor, separating and heating out the resultant precipitate, and fourthly recovering the lime-chloride solution, substantially as specified.

In testimony whereof I affix my signature in presence of two witnesses.

MATHEW E. ROTHBERG.

Witnesses:
JOHN H. BROWN,
EDW. E. LEVERGOOD.